(12) United States Patent
Tien

(10) Patent No.: US 7,782,631 B2
(45) Date of Patent: Aug. 24, 2010

(54) FLAT PANEL DISPLAYS

(75) Inventor: Chih-Wei Tien, Chiayi County (TW)

(73) Assignee: Qisda Corporation, Taoyuan County (TW)

( * ) Notice: Subject to any disclaimer, the term of this patent is extended or adjusted under 35 U.S.C. 154(b) by 1350 days.

(21) Appl. No.: 11/248,177

(22) Filed: Oct. 13, 2005

(65) Prior Publication Data

US 2006/0084299 A1    Apr. 20, 2006

(30) Foreign Application Priority Data

Oct. 14, 2004    (TW) .............................. 93131126 A

(51) Int. Cl.
*H05K 9/00*    (2006.01)

(52) U.S. Cl. ...................... 361/816; 361/796; 361/798; 361/801; 361/802

(58) Field of Classification Search ................ 361/816, 361/796, 798, 801, 802; 439/61, 325; 312/223.2
See application file for complete search history.

(56) References Cited

U.S. PATENT DOCUMENTS

| | | | | |
|---|---|---|---|---|
| 5,227,582 A | * | 7/1993 | Velasco et al. | 174/372 |
| 6,239,359 B1 | * | 5/2001 | Lilienthal et al. | 174/370 |
| 6,859,371 B2 | * | 2/2005 | Huang | 361/818 |
| 7,313,002 B2 | * | 12/2007 | Yuan et al. | 361/818 |
| 2004/0246693 A1 | * | 12/2004 | Lloyd et al. | 361/800 |

* cited by examiner

*Primary Examiner*—Jinhee J Lee
*Assistant Examiner*—Abiy Getachew

(57) ABSTRACT

A flat panel display. A panel module and a first securing assembly. A shield has a longitudinal first opening at a side thereof, extending along a first direction. A connection member has a recess extending along the first direction and a second opening extending along a second direction. A panel module is disposed in the recess. The first securing assembly is fastened through the first and second openings and movable with respect to the first and second openings to secure the shield and the connection member.

7 Claims, 4 Drawing Sheets

FLAT PANEL DISPLAYS

BACKGROUND

The invention relates in general to flat panel displays and in particular to flat panel displays with rear shields for display panels of different sizes.

Generally, a conventional flat panel display comprises a printed circuit board (PCB) provided with driving circuits and signal processing circuits, thereby generating specific electric signals for controlling and producing digital images via a panel module. The printed circuit board is normally disposed between the panel module and a shield connected to the rear of the flat panel display. The panel module is joined with the shield to fix the printed circuit board in the flat panel display. To fit different panel modules in various sizes, corresponding shields of different sizes have to be provided. However, it may potentially increase manufacture complexity and cost.

SUMMARY

Flat panel displays are provided. An embodiment of a flat panel display comprises a shield, a connection member, a panel module and a first securing assembly. The shield has a longitudinal first opening at a side thereof, extending along a first direction. The connection member has a recess extending along the first direction and a second opening extending along a second direction. The panel module is disposed in the recess. The first securing assembly is fastened through the first and second openings and movable with respect to the first and second openings to secure the shield and the connection member.

DETAILED DESCRIPTION

Figure 1:
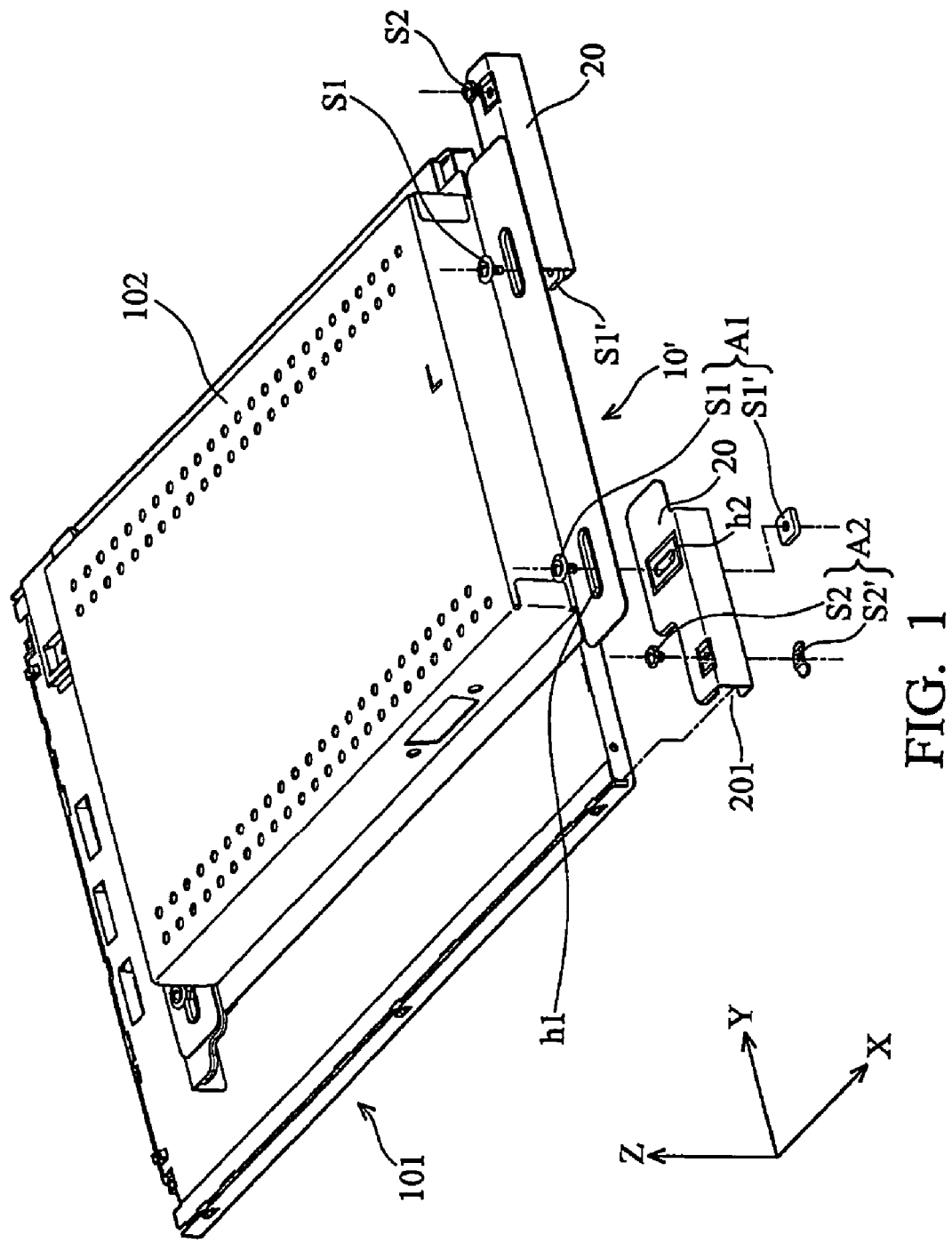
FIG. 1 is a exploded diagram of an embodiment of a flat panel display.
Figure 2:
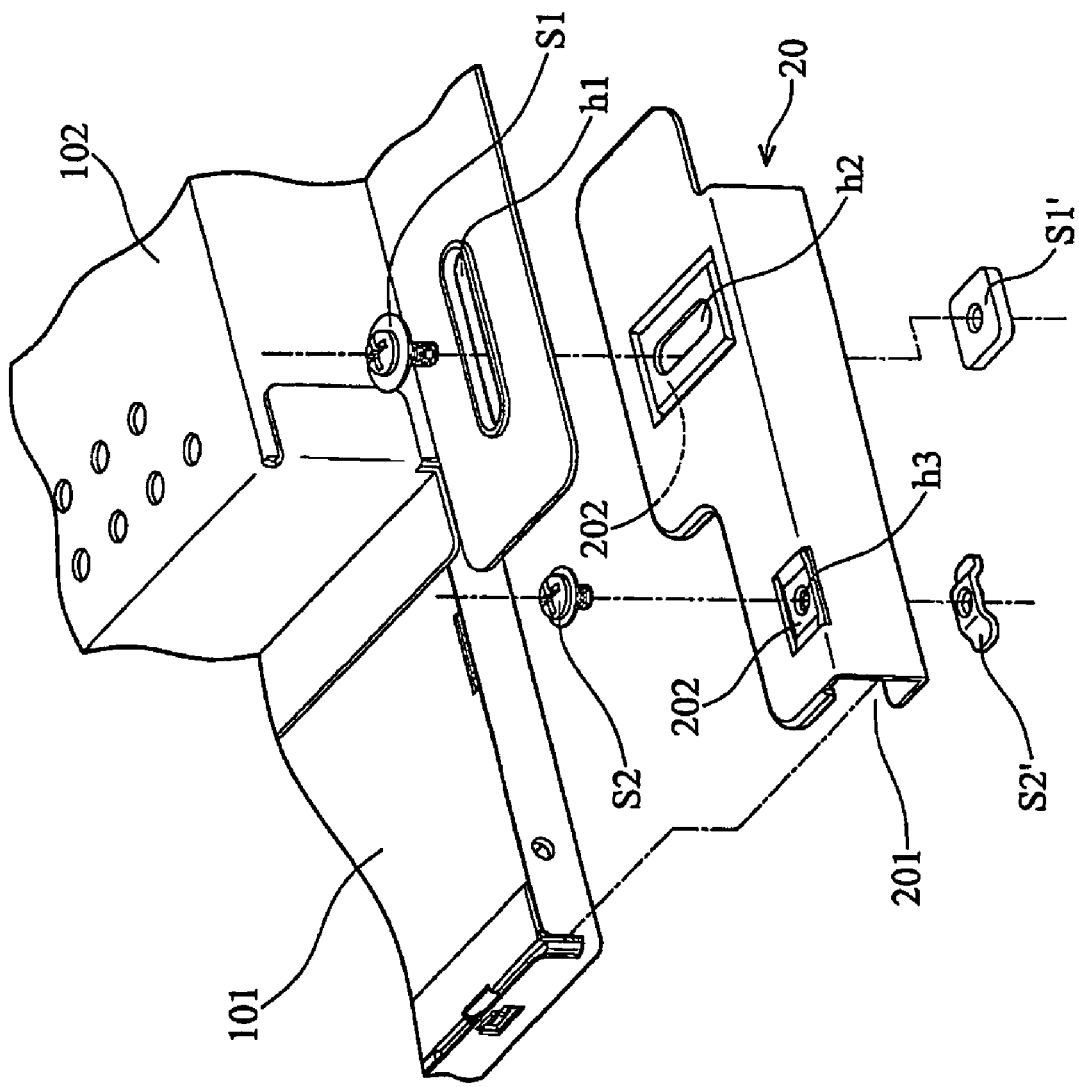
FIG. 2 is a exploded diagram of the connection member joined with the shield and the panel module in FIG. 1.

Referring to FIG. 1, an embodiment of a flat display 10 comprises a panel module 101, a shield 102, a connection member 20 for connecting the panel module 101 and the shield 102, a first securing assembly A1 and a second securing assembly A2. The shield 102 has a longitudinal first opening h1 disposed at a side 10' of the shield 102, extending in a first direction Y (Y axis) parallel to the side 10'. Referring to FIGS. 1 and 2, the connection member 20 has an U-shaped cross-section forming a recess 201 extending in the first direction Y with the panel module 101 fixed therein. The connection member 20 has a longitudinal second opening h2 in a second direction X (X axis) perpendicular to the first direction Y.

As shown in FIGS. 1 and 2, the first securing assembly A1 comprises a first bolt S1 and a first nut S1'. The first bolt S1 is fastened through the first opening h1 of the shield 102 and the second opening h2 of the connection member 20. Moreover, the first bolt S1 is joined with the first nut S1', thereby securing the connection member 20 with the shield 102.

Specifically, before the first securing assembly A1 firmly secures the connection member 20 and the shield 102, the first bolt S can slide in the first opening h1 with respect to the shield 102 along the first direction Y and in the second opening h2 with respect to the connection member 20 along the second direction X. Thus, the shield 102 can fit display panels 101 of various sizes by appropriate connection and adjustment of the connection member 20 and the first securing assembly A1.

Figure 3:
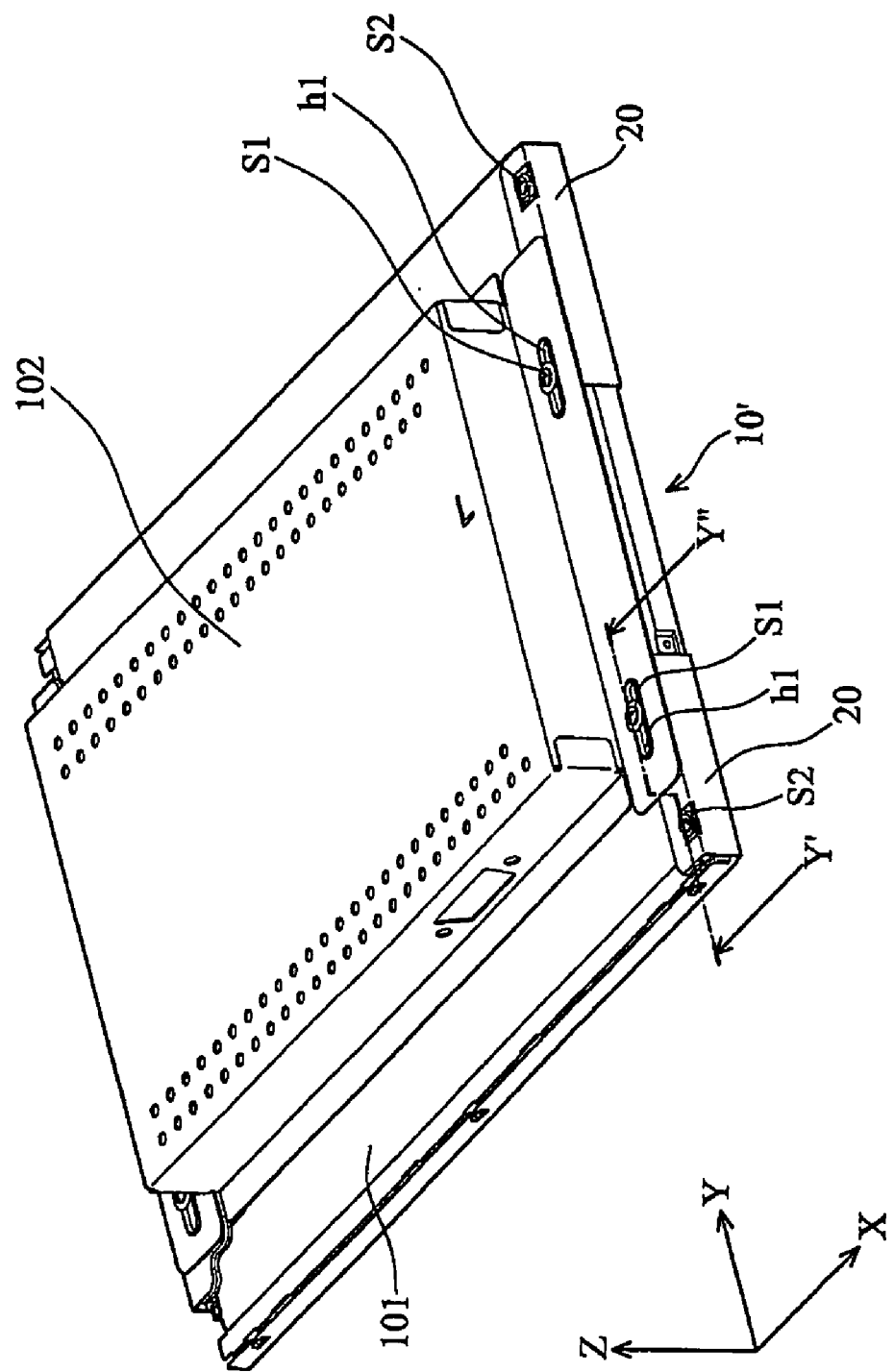
FIG. 3 is a perspective diagram of the flat panel display in FIG. 1.
Figure 4:
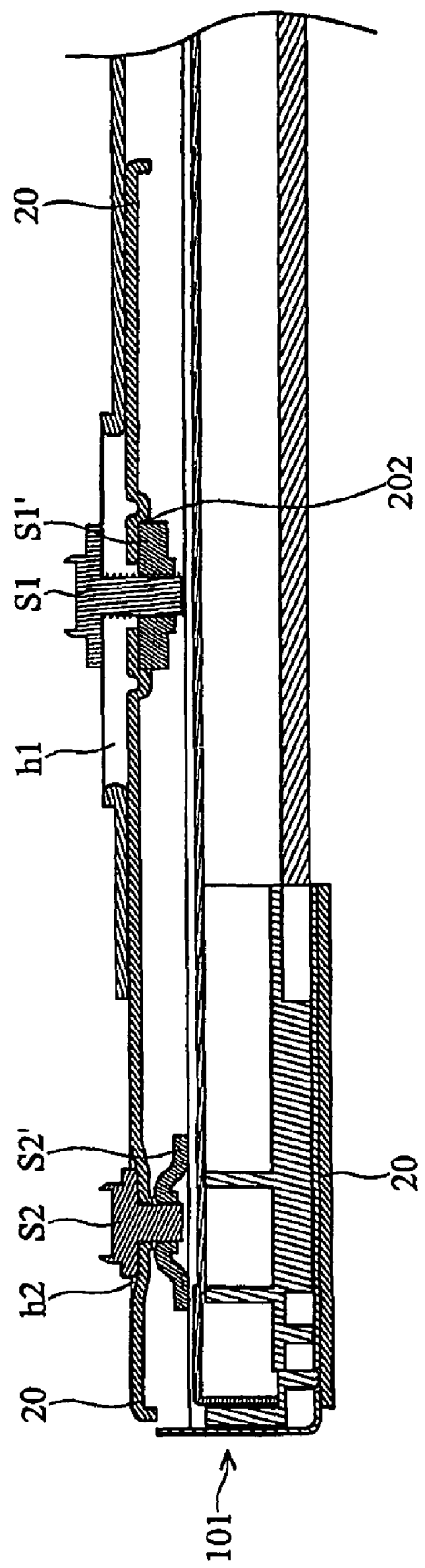
FIG. 4 is a sectional view along Y'-Y" in FIG. 3.

FIG. 4 is a sectional view along Y'-Y'" in FIG. 3. As shown in FIGS. 2 and 4, the connection member 20 has a longitudinal depression 202 on the surface of the recess 201, extending along the second direction X. The depression 202 is substantially rectangular, and correspondingly, the first nut S1' is square and capable of sliding therein. As the first nut S' can be guided and adjusted along the depression 202, the connection member 20 can be shifted with respect to the shield 102 along X and Y axes respectively, thereby preventing unstable rotation during assembly.

As shown in FIGS. 2 and 4, the second securing assembly A2 comprises a second bolt S2 and a second nut S2'. The second bolt S2 is fastened through a corresponding threaded hole h3 of the connection member 20 and joined with the second nut S2' to secure the panel module 101 and the connection member 20. As shown in FIG. 4, the second nut S2' abuts the panel module 101 and firmly secures the panel module 101 in the recess 201.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A flat panel display, comprising:
a shield, comprising a longitudinal first opening at a side thereof, wherein the first opening extends in a first direction; a connection member, forming a recess extending along the first direction and a longitudinal second opening extending along a second direction; a panel module fixed in the recess; and a first securing assembly fastened through the first and second openings, being movable with respect to the first and second openings to secure the shield and the connection member;
the first securing assembly including a first bolt fastened through the first and second openings and a first nut joined with the first bolt, thereby securing the shield and the connection member; and the connection member including a longitudinal depression extending along the second direction on the surface of the recess, and the first nut being movably disposed in the depression along the second direction.

2. The flat panel display as claimed in claim 1, wherein the first direction is substantially perpendicular to the second direction.

3. The flat panel display as claimed in claim 1, wherein the first direction is parallel to the side of the shield.

4. the flat panel display as claimed in claim 1, wherein the depression is substantially rectangular, and the first nut is substantially square.

5. The flat panel display as claimed in claim 1 further comprises a second securing assembly comprising a second bolt, and the connection member further comprising a threaded hole with the second bolt fastened therethrough.

6. The flat panel display as claimed in claim 5, wherein the second securing assembly further comprises a second nut joined with the second bolt, thereby securing the panel module and the connection member.

7. The flat panel display as claimed in claim 6, wherein the second nut abuts the panel module, thereby fixing the panel module in the recess of the connection member.

* * * * *